United States Patent

[11] 3,623,563

| [72] | Inventor | Frank T. Gostomski |
| | | 1053 N. Beech St., Wahoo, Nebr. 68066 |
| [21] | Appl. No. | 868,015 |
| [22] | Filed | Oct. 21, 1969 |
| [45] | Patented | Nov. 30, 1971 |

[54] SUPPORT MEANS FOR SNOWMOBILES
7 Claims, 8 Drawing Figs.

[52] U.S. Cl. .................................................. 180/5 R,
180/9, 180/38, 280/14, 280/25
[51] Int. Cl. ...................................................... B62m 27/02
[50] Field of Search ........................................... 180/3–6,
9.38; 280/26, 14, 25

[56] References Cited
UNITED STATES PATENTS

| 3,011,576 | 12/1961 | Howes | 180/5 |
| 3,023,824 | 3/1962 | Bombardier | 180/5 |
| 3,213,955 | 10/1965 | Hetteen | 180/5 |
| 3,435,907 | 4/1969 | Imhoff | 180/5 |
| 3,477,734 | 11/1969 | Albertson | 280/11 |
| 3,525,412 | 8/1970 | Erickson | 280/26 X |

Primary Examiner—Richard J. Johnson
Attorney—Henderson and Strom

ABSTRACT: A support means adapted for use with snowmobiles is provided which comprises two laterally aligned support shafts depending from one end of the snowmobile; each of the support shafts has a bracket formed on the lower end thereof. Axles extend horizontally from the lower ends and are adapted to secure either skis or wheels thereon. Resilient plugs are affixed to the brackets, the lower ends of which are disposed proximate the top surfaces of the skis. The resilient plugs prevent the skis from rotating more than a present distance and absorb some of the initial shock in rough terrain.

PATENTED NOV 30 1971 3,623,563

INVENTOR.
FRANK T. GOSTOMSKI
BY Henderson & Strom
ATTORNEYS

SUPPORT MEANS FOR SNOWMOBILES

BACKGROUND OF THE INVENTION

This invention relates to support means for snowmobiles and, more specifically, to support means for snowmobiles which can rotatably and demountably secure either wheels or skis thereon.

Snowmobiles have been widely used as winter vehicles and now, in addition, are gaining popularity as summertime vehicles. For summer utilization, it is important that the skis be replacable with wheels with a minimum of inconvenience and time and that the snowmobile be easily steerable. Present snowmobile structures, however, do not provide these conveniences.

Typical constructions and structures utilizing skis and wheels are exemplified by Robitaille, U.S. Pat. No. 2,708,978; Broadwater, U.S. Pat. No. 2,312,071; Kauffmann, U.S. Pat. No. 3,369,624; Hansen, U.S. Pat. No. 3,318,403; Aeder, U.S. Pat. No. 3,252,533; and Pederson, U.S. Pat. No. 3,336,994.

The support means of this invention allows the skis to readily and quickly be replaced with wheels. Additionally, by proper engineering of the support means, steering of the snowmobile is facilitated regardless of whether wheels or skis are being utilized on the snowmobile.

SUMMARY OF THE INVENTION

This invention relates to a support means for a snowmobile-type vehicle having a front end and a rear end and a drivable endless track for motive power and means for driving the track. The support means comprises two transversely aligned support shafts depending downwardly from proximate one of the ends of the snowmobile. Brackets are affixed at or near the lower ends of each of the support shafts and axles are horizontally affixed at or near the lower ends of each of the support shafts. The axles are disposed perpendicularly of the direction of travel and are designed to secure either wheels or skis thereon. A ski is rotatably secured to each of the axles by a mounting member secured intermediate the ends of the ski. The mounting member has a hole formed therethrough transversely of the ski for rotatably and demountably securing the skis to the axles. Resilient means are secured to the mounting member and the lower end of the resilient means is disposed proximate the top surface of the skis.

An advantage of this support means over the prior art devices is that the skis can be readily and quickly replaced by wheels.

Additionally, by providing resilient means between the brackets and the skis, the skis are prevented from rotating more than a present distance. Therefore, skis are not broken when the snowmobile leaves the ground and returns thereto. The initial shock on landing is also partially absorbed by the resilient means.

By providing a single axle for either wheels or skis and by forming the hole in the ski bracket sufficiently close to the top surface of the ski, steering is also facilitated. Wheels raise the front end of the snowmobile and remove a portion of the weight from the bogie wheels. Therefore, the snowmobile is easier to guide when there is no snow cover. With skis on the support means, the entire track is in contact with the snow and better flotation of the snowmobile is achieved.

DESCRIPTION OF THE PREFERRED EMBODIMENTS

Figures 1, 2:
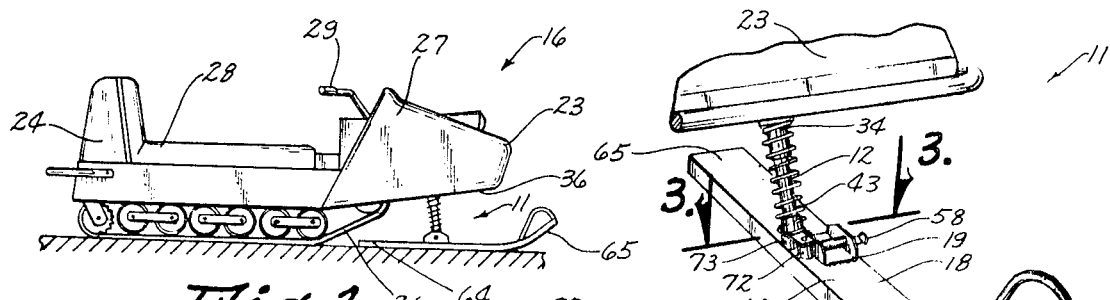
FIG. 1 is a side view of a snowmobile utilizing the support means of this invention.
FIG. 2 is an enlarged perspective view of the support means of the invention with the snowmobile cut away.

Referring now to the drawings, the support means of this invention is indicated generally at 11 in FIGS. 1-8. The support means 11 comprises two support shafts 12 (FIGS. 2-5, 7-8) having bracket means 13 affixed thereto. Axle means 14 are also affixed to the support shafts 12 perpendicularly of the direction of travel of the snowmobile 16 and are adapted to secure either wheels 17 (FIGS. 6-8) or skis 18 (FIGS. 1-5) thereon. Two skis 18 having mounting members 19 (FIGS. 2-5) secured thereon, the mounting members 19 each having a hole 21 formed therethrough transversely of the ski 18, are secured to the axle means 14. Resilient means 22 (FIGS. 4, 5 and 8) are affixed to the bracket means 13 and the lower ends of the resilient means 22 are disposed proximate the tip surface of the skis 18.

More specifically, the support means 11 of this invention is generally utilized with a conventional snowmobile 16 (FIGS. 1 and 6) and forms a portion of the steering apparatus. The snowmobile 16 has a front end 23 and a rear end 24 and utilizes a drivable, endless track 26 for motive power. The snowmobile 16 generally comprises a light gauge metal shell 27 having a motor (not shown) mounted therein for driving the track 26. A passenger seat 28 is normally provided at the rear end 24 of the snowmobile 16.

The snowmobile 16 is guided with a rotatable steering bar 29 (FIGS. 1 and 6) which is generally and preferably operatively secured to support means 11 of this invention. More specifically, two support shafts 12 depend downwardly from one of the ends 23 and 24, preferably the front end 23, of the snowmobile 16. The support shafts 12 are transversely aligned and disposed on opposing sides of the snowmobile 16 and generally inclined forwardly from the upper end 31 to the lower end 32.

The support shafts 12 (FIGS. 4 and 5) are generally of elongate, cylindrical configuration and have a longitudinal axis 33. When used as a portion of the steering apparatus, each of the support shafts 12 are rotatable about its longitudinal axis 33 and movable back and forth a preset distance along its longitudinal axis 33.

The upper end 31 (FIG. 4) of the support shafts 12 extend through a sleeve 34 which depends downwardly from the lower surface 36 of the snowmobile 16. A rubber bushing 37 is provided around the lower end 32 of the support shafts 12. As the skis 18 or wheels 17 strike obstructions, the support shaft 12 can move upwardly the distance between the lower end 38 of the sleeve 34 and the upper surface 39 of the rubber bushing 37. A coil spring 41 having an upper end 42 and a lower end 43 encircles each of the support shafts 12. The upper end 42 bears against the lower surface 36 of the snowmobile 16 while the lower end 43 bears against the bracket means 13. The springs 41 normally urge the support shafts 12 downwardly and act as shock absorbing members for the snowmobile 16 regardless of whether skis 18 or wheels 17 are being utilized.

Bracket means 13 (FIGS. 3-5, and 8) are rigidly affixed proximate the lower ends 32 of the support shafts 12. The bracket means 13 is generally formed from angle iron or the like and is rigidly affixed to the lowermost end 44 of the support shafts 12. The bracket means 13 is longitudinally aligned with the skis 18 and extends both backwardly and forwardly of the lowermost end 44 of the support shafts 12.

The angle iron bracket means 13 (FIGS. 3-5 and 8) is disposed so that the upper portion 46 is horizontally disposed and extends inwardly while the lower portion 47 is vertically disposed. Apertures (not shown) are formed through the ends 48 and 49 (FIGS. 3 and 4) of the bracket means 13 for securing the resilient means 22 thereto with bolts 51.

The bracket means 13 (FIGS. 3–5 and 8) can be welded to the lowermost end 44 of the support shaft 12 or an aperture (not shown) can be formed through the upper portion 46 of the bracket means 13 to accommodate the end 44 of the support shaft 12. The bracket means 13, in any event, is generally welded or otherwise rigidly affixed to the support shaft 12.

An aperture 52 (FIG. 5) is also generally formed through the lower portion 47 of the bracket means 13 to secure therein the axle means 14. The axle means 14 is normally a substantially cylindrical shaft 53 having two ends 54 and 56. The cylindrical shafts 53 are each secured proximate one end 54 to the lower ends 32 of the support shafts 12. The cylindrical shafts 53 are disposed horizontally and perpendicularly of the direction of travel of the snowmobile 16 and the free ends 56 extend outwardly.

Figures 3, 4, 5:
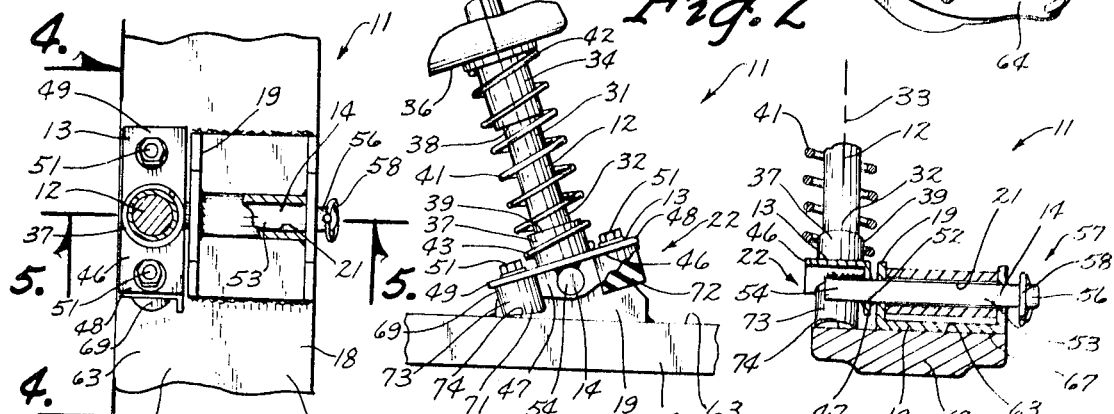
FIG. 3 is an enlarge cross-sectional view of the support means taken along line 3—3 of FIG. 2.
FIG. 4 is a side view of the support means taken along line 4—4 of FIG. 3 with a portion of the resilient means shown in cross section.
FIG. 5 is a cross-sectional view of the support means taken along line 5—5 of FIG. 3.
Figure 6:
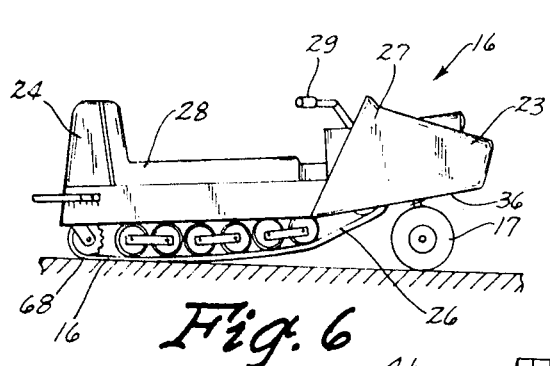
FIG. 6 is a side view of the snowmobile of FIG. 1 having wheels in place of skis.
Figure 7:
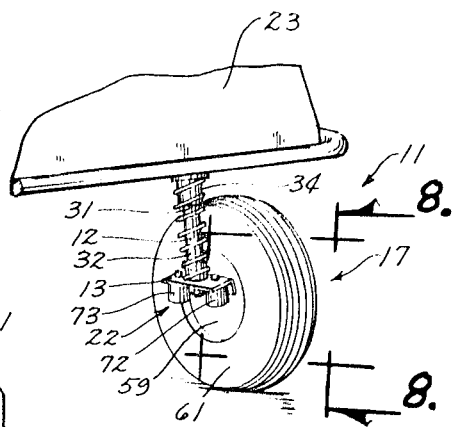
FIG. 7 is an enlarged perspective view of the support means shown in FIG. 6.
Figure 8:
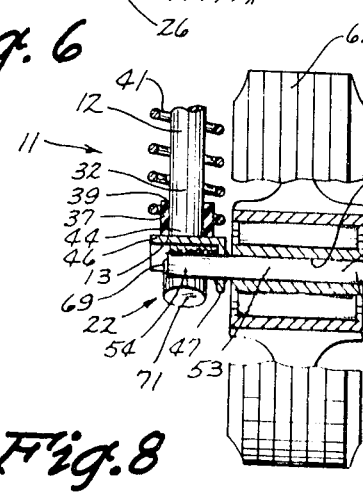
FIG. 8 is a cross-sectional view of the support means taken along line 8—8 of FIG. 7.

The cylindrical shafts 53 are designed to secure either wheels 17 of skis 18 thereon. The free ends 56 are equipped with means 57 for securing skis 18 or wheels 17 thereon. This means 57 can be a hole in the shaft equipped with a cotter key (not shown) or locking ring 58 (FIGS. 3 and 5).

Two skis 18 or two wheels 17 are rotatably and demountably secured on the cylindrical shafts 53. The wheels 17 are of standard construction having a hub 59 with an aperture 60 therethrough for receiving the shaft 53 and a tire 61.

The skis 18, however, are of unique construction. Mounting members 19 of generally U-shaped configuration are secured to the top surfaces 63 of the skis 18 intermediate the ends 64 and 65 thereof. The mounting members 19 each have a hole 21 formed therethrough transversely of the ski 18. The cylindrical shaft 53 extends through this hole 21 and rotatably and demountably secures the ski 18 thereon.

The mounting members 19 are preferably secured on the outer portion 67 of the skis 18. The hole 21 formed in the mounting member 19 is also preferably disposed above and very near to the top surfaces 63 of the ski 18. With this construction, the weight of the snowmobile 16 is primarily supported by the track 26 thereby giving the snowmobile 16 better flotation and the skis 18 do not dig deeply into the snow. However, when the wheels 17 are secured on the cylindrical shafts 53, weight is transferred to the rear portion 68 of the track 26 and to the front wheels 17. Therefore, the snowmobile 16 is easier to steer in the absence of snow if the skis 18 are replaced by wheels 17.

Resilient means 22 are affixed to the bracket means 13. Each of the resilient means 22 has an upper end 69 and a lower end 71. The upper ends 69 are juxtaposed of the bracket means 13 and the lower ends 71 are disposed proximate the top surfaces 63 of the skis 18.

Each of the resilient means 22 generally comprises two resilient plugs 72 and 73 secured to the upper portion 46 of bracket means 13 by bolts 51. One of the plugs 72 is disposed forwardly of the lowermost end 44 of the support shaft 12 and the second plug 73 is secured backwardly of the lowermost end 44 of the support shaft 12. The plugs 72 and 73 are vertically aligned with the inner portion 74 of the ski 18 and disposed above the top surface 63 of the ski 18. The ski 18 can, therefore, rotate around shaft 53 a preset distance to conform to the terrain. It cannot, however, rotate so far as to become substantially vertically oriented and break off when the snowmobile 16 lands. These resilient plugs 72 and 73 also cushion the impact on landing and, to some extent, cushion the ride of the snowmobile 16.

I claim:

1. A support means for a snowmobile-type vehicle having a front end and a rear end, a drivable endless track for motive power and means for driving the track; the support means comprising:

two supports shafts depending from proximate one of the ends of the snowmobile, shafts being transversely aligned;

bracket means affixed proximate the lower ends of each of said support shafts with the ends thereof extending backwardly and forwardly of the lower ends of said support shaft;

axle means horizontally affixed to each of said support shafts, wherein each of said axle means is a substantially cylindrical shaft having two ends and is secured proximate one of said ends to said support shaft and extends outwardly therefrom, the other of said ends having means formed thereon for rotatably securing either a wheel or a ski thereon;

two skis having mounting members secured thereto intermediate the ends thereof, said mounting members each having a hole formed therethrough transversely of the ski for rotatably and demountably securing said skis on said shafts; and resilient means affixed to and depending from each of said bracket means wherein each said resilient means is at least two resilient plugs, one of said plugs being disposed forwardly of said support shaft lower end and the second of said plugs being disposed backwardly of said support shaft lower end, whereby said skis are rotatable a preset distance about their respective said shaft.

2. The support means of claim 1, wherein said support shafts are disposed proximate the front end and on opposing sides of the snowmobile.

3. The support means of claim 2, wherein each of said support shafts has a longitudinal axis and is rotatable about said longitudinal axis and movable back and forth a preset distance along said longitudinal axis.

5. The support means of claim 3, wherein said mounting members on said skis are secured on the outer portion of said top surface of said skis and said resilient plugs are vertically aligned with the inner portion of said skis and normally disposed proximate the top surface of said skis.

4. The support means of claim 3, wherein a coil spring having two ends encircles each of said support shafts, one of said ends bearing against said bracket means and the other of said ends bearing against the lower surface of the snowmobile, whereby said shafts are normally urged downwardly.

6. The support means of claim 5, wherein said holes in said mounting members are disposed above and proximate to said top surface of said skis.

7. The support means of claim 6, wherein said support shafts depend downwardly and forwardly.

* * * * *